United States Patent Office 3,517,763
Patented June 30, 1970

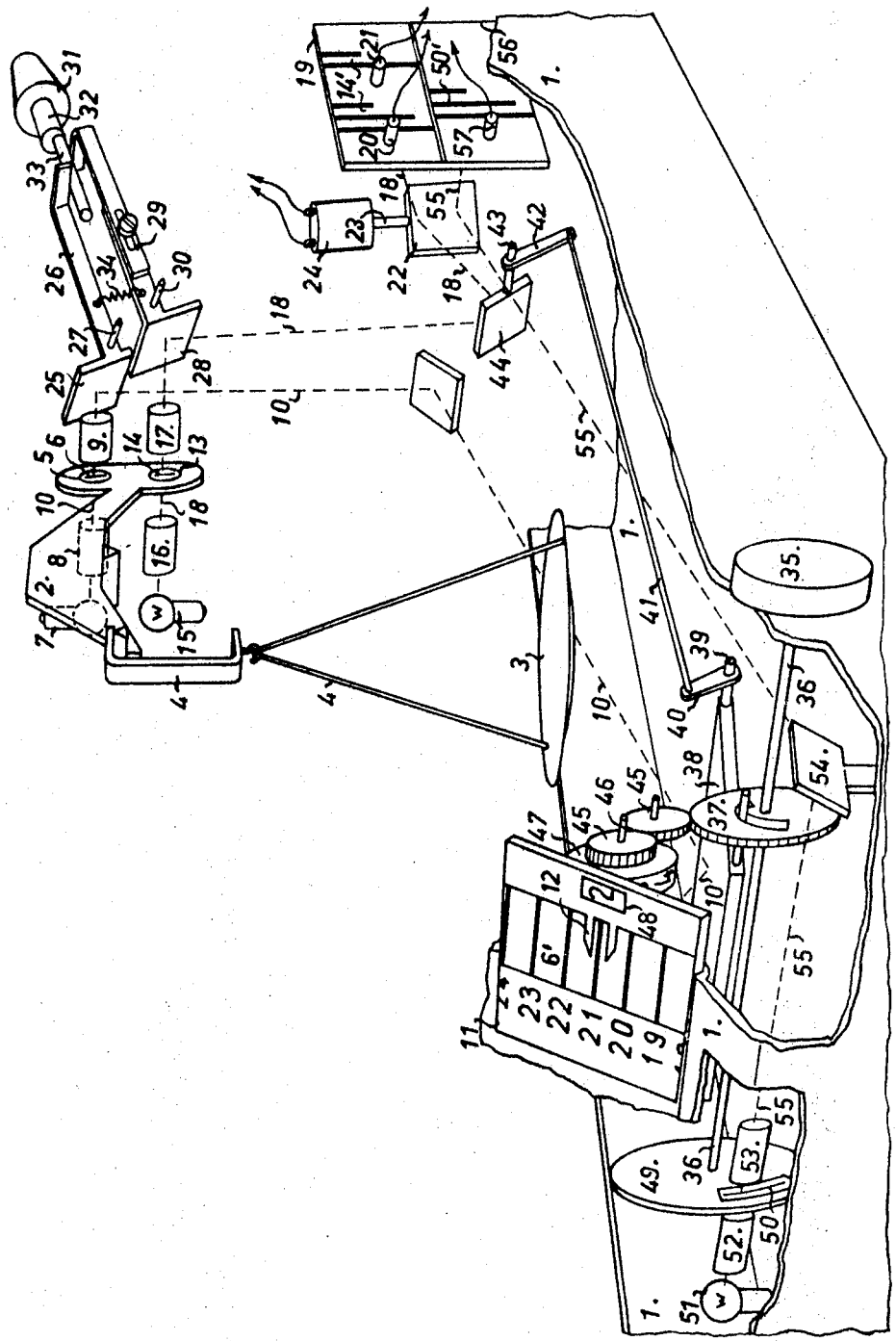

3,517,763
PRECISION BALANCE
Jon Peer, Stafa, Switzerland, assignor to Mettler Instrumente A.G., Zurich, Switzerland, a corporation of Switzerland
Filed May 20, 1968, Ser. No. 730,348
Claims priority, application Switzerland, Dec. 14, 1967, 17,557/67
Int. Cl. G01g 23/14, 23/32, 23/42
U.S. Cl. 177—173      4 Claims

ABSTRACT OF THE DISCLOSURE

Precision balance of the type including a balance beam on which are provided scales for reading off the weight decimals of the weighing result according to the particular inclination of the balance beam. By means of a first optical projection system said weight decimals may be read off in digital form from a screen visible from the outside of the balance. A second projection system and an electric scanning device are provided for transforming said weight decimals into corresponding electrical values. An adjusting device is included for resetting the zero point of the balance, said device controlling both a light deflecting element inserted in said first projection system and also a light deflecting element inserted in said second projection system.

---

In inclination balances for heavy loads there is usually provided a measuring plate pivoted by the balance beam, and on which is a scale in coded form having all the decades of weight determined by the particular inclination of the balance beam. By means of a projection system the portion of the measuring plate located in the optical axis causes an image to be produced at an electric light scanning device and this device delivers electric pulses which act in conventional manner on electronic amplifiers. The amplified and possibly also converted pulses can then be used for remote indication of the weighing result and/or to operate an electromechanical printing mechanism. In addition there is then in most cases also remote control of the balance, and fully automatic operation of inclination balances of this type suitable for heavy loadings does not cause any particular difficulties because of the comparatively low absolute sensitivity of such balances.

In contrast to this the precision or analytical balances predominately used in laboratories are of an absolute sensitivity which is orders higher. The use of such high degrees of sensitivity presupposes that the balance is provided with a mechanical-optical adjusting device to reset the zero point. In addition in laboratory tests the weighing material is commonly required to be under visual observation and the weighing operation is to be under continuous control in order to permit the decisive adjustments to the balance to be effected.

The primary object of the present invention is to provide a precision balance of high degrees of sensitivity as used in laboratories which permits the remote indication of the weighing results and/or the operation of an electro-mechanical printing mechanism. This is achieved, in accordance with the invention, by providing in a precision balance, a balance beam having scales for reading off the weight decimals of the article to be weighed according to the inclination of the balance beam, a first scale of which having said weight decimals inscribed in digital form and a second scale of which having said weight decimals inscribed in coded form; a first projection apparatus producing an optically enlarged image from the particular part of said first scale onto a screen visible from the outside of the balance, a second projection apparatus producing an optically enlarged image from the particular part of said second scale at an electric light scanning device for transforming said weight decimals into corresponding electrical values, and a mechanical-optical adjusting device simultaneously controlling both a light deflecting element of said first projection apparatus and also a light deflecting element of said second projection apparatus for resetting the zero point of the balance.

Other objects and advantages of the invention will become apparent from the study of the following specification when considered in connection with the accompanying drawing, in which the single figure is a perspective view of the essential parts of a precision balance according to the present invention and in which any details not directly essential to an understanding of the invention have been omitted.

Referring to the drawing, on the balance frame 1 (only illustrated in part) the balance beam 2 is fulcrumed in conventional manner. The mounting supporting its central knife edge is not illustrated. On the outer knife edge provided on the shorter arm of the beam 2 is hung a bar 4 carrying the balance pan 3. Alternatively the bar 4 may be replaced by a pan carrier having at its upper end the balance pan and being guided parallel by means of an additional link. A measuring plate 5 is secured to the longer arm of the beam 2, on which measuring plate the usual graduations with the appropriate digits 6 are inscribed for indicating the weight decimals according to the inclination of the beam 2. By means of a first projecton apparatus comprising a lamp 7, the illuminating condenser means 8, the objective 9 and having the optical axis 10, an optically enlarged image 6′ of the particular part of the scale 6 which dips into the optical axis 10 is thrown onto a ground glass plate acting as a screen 11. In the drawing the graduation indicated with the figure "21" is located at a reading mark 12 provided on the screen 11. The screen 11 is normally mounted in a window in the balance housing, so that the image 6′ can easily be read from outside.

A further measuring plate 13 is also secured to the longer arm of the beam 2, and the weight decimals corresponding to the inclination of the beam 2 are inscribed on the measuring plate 13 in the form of a coded scale 14. By means of a second projection apparatus comprising the lamp 15, the illuminating condenser means 16, the objective 17 and having the optical axis 18, an optically enlarged image 14′ of the particular section of the coded scale 14 is thrown on to the image plane 19 of an electrical light scanning device. As illustrated the image 14′ consists of bars having graduated lengths. Within the balance housing adjacent the image plane 19 there is provided a stationary mounted photocell 20 or 21 for each of the two weight decimal places of the image 14′ to be scanned. The photocells 20 and 21 however can also consist of light-sensitive resistances, and as usual they are connected to electronic amplifiers not illustrated in the drawing. The scanning operation itself is effected by means of a pivoting mirror 22 which is within the optical axis 18, pivotal movement of the mirror 22 about the shaft 23 being effected by means of an electro-mechanical drive means 24. The arrangement is such that when the mirror 22 is pivoted through a small angle the image 14′ is moved past the photocells 20 and 21 in a direction transverse to the longitudinal direction of the bars of the image 14′. This results in electric pulses being produced by the photocells 20 and 21, the number of which being equal to the number of bars of the scale 14 so that the photocell 20 records two pulses and the photocell 21 only records one pulse, both photocells 20 and 21 thus delivering an electrical measured value which corresponds to the figure "21" (as seen in the image 6' on the screen 11).

The mechanical-optical adjusting device required in precision or analytical balances to reset the zero point of the balance comprises an element 25 in the form of a mirror which is located in the optical axis 10 of the first projection apparatus 7 to 11 and is mounted on the shorter arm of a lever 26. The latter is pivotable about a shaft 27 mounted in the balance frame 1. In a similar manner a further light deflecting element 28 also in the form of a mirror, is arranged in the optical axis 18 of the second projection apparatus 15 to 19. A lever 29 which holds the mirror 28 is however provided with an arm of adjustable length and is mounted for pivotal movements about a further shaft 30 rotatably mounted in the balance frame 1. To operate this adjusting device manually, a knob 31 accessible from the exterior is provided, this knob being mounted on a shaft 32 rotatably arranged in the balance frame 1. The shaft 32 has an eccentrical spindle 33 against which the two levers 26 and 29 are urged by a tension spring 34. By adjusting the length of the lever 29, it is possible to take into account the different optical enlargement factors of the two projection apparatus so that a zero point setting effected by means of the image 6' is precisely transmitted to the image 14'. Instead of the mirrors 25 and 28, other light deflecting elements such as prisms or plain parallel plates can be used in the mechanical-optical adjusting device described.

In precision or analytical balances of high accuracy usually there is provided an optical micrometer having adjusting means to determine the last weight decimals of the weighing result. In the embodiment illustrated in the drawing the optical micrometer has a knob 35 operated from the outside of the balance housing and mounted on a shaft 36 rotatably mounted in the balance frame 1. A cam plate 37 acting at the same time as a gear wheel is secured to the shaft 36. By means of this cam plate 37 a light deflecting element in the form of a mirror 38 can be pivoted through a small angle about a shaft 39 rotatably mounted in the balance frame 1. The mirror 38 is located in the optical axis 10 of the first projection apparatus 7 to 11. Simultaneously with the mirror 38 a lever 40 is also pivoted, and this in turn controls a further lever 42 by means of a transmission rod 41. The lever 42 is secured to a shaft 43 rotatably mounted in the frame of the balance, the shaft 43 serving to pivot a further mirror 44, which is located in the optical axis 18 of the second projection apparatus 15 to 19. Instead of the two mirrors 38 and 44, prisms or plain parallel plates of suitable dimensions can also be used. However, the two levers 40 and 42 and the transmission rod 41 may be replaced by other transmission means to bring about the simultaneous pivotal movement of the mirrors 38 and 44. The important fact is that the mechanical transmission ratio used is matched to the optical enlargement factors of the two projection apparatus, so that when the knob 35 is turned the two images 6' and 14' are displaced by equivalent distances in the longitudinal direction of the scales. In other words the fractional movements of the images 6' and 14', referred to their graduation unit, should be equal.

In order to make the last decimal place of the weighing result recognisable in figures, a gear wheel drive 45 is provided by means of which a reading drum 47 rotatable about a shaft 46 is moved from the shaft 36. The last decimal place to be read off then appears in a window 48 which is positioned directly adjacent to the reading mark 12. In order to determine this last decimal place of the weighing result, the knob 35 is turned until the nearest graduation of the image 6' of the scale 6 is precisely in the centre of the reading mark 12. The figure then appearing in the window 48 gives the last decimal place. In the drawing the complete weighing result would be read off as "212." It is obvious however that the scale 6 very often contains three decimal places whereas the micrometer contains two decimal places.

If for example a remote indication of the complete weighing result is to be provided, the last decimal place as given by the micrometer has to be read off electrically. In order to achieve this, a disc-shaped measuring member 49 is secured to the shaft 36 of the micrometer, on which member 49 are provided in coded form along the arcute section 50 the last decimal places corresponding to the particular seting of the micrometer. By means of a third projection apparatus comprising a lamp 51, illuminating condenser means 52, an objective 53 and having the optical axis 55 an optically enlarged image 50' of the particular part of the section 50 which dips into the optical axis 55 is thrown via the mirrors 54 and 22 onto the image plane 56 of a further electric light scanning device. Adjacent the image plane 56 there is mounted a further stationary photocell 57 and when the scanning mirror 22 is pivoted, the image 50' is moved past this photocell 57. In this scanning operation the photocell 57 produces two electrical pulses, which corresponds to the figure "2" visible in the window 48. Instead of using the mirror 22 a separate mirror only provided for the third projection apparatus may be fastened to the shaft 23.

As already apparent from the drawing, the two scanning devices 19 to 24 and 56 to 57 are preferably combined to form a single scanning system, so that by means of one and the same electro-mechanical drive 23 to 24 all the decimal places of the weighing result can simultaneously be converted into electrical values. The electric pulses delivered by the photocells 20, 21 and 57 usually are electronically amplified and can then be used to actuate additional devices not built into the balance as this is the case when using a remote indication of the weighing result.

The particular advantage of the precision balance described however lies in the fact that the weighing operation can also be kept under constant visual observation. Any irregularities which may occur are therefore immediately apparent and can be taken into account before the electrical scanning operation is carried out. On the other hand the electrical determination of the weighing result permits extensive automtaion of many laboratory tests and in particular permits the automatic recording of weighing results by means of remotely controlled printing mechanisms.

While in accordance with the provisions of the patent statutes, the preferred form and embodiments of the invention have been illustrated and described, it will be apparent to those skilled in the art that modifications may be made without deviating from the invention as set forth in the following claims.

I claim:

1. A precision balance including a balance beam on which are provided scales for reading off the weight decimals of the article to be weighed according to the inclination of the balance beam, a first scale of which having said weight decimals inscribed in digital form and a second scale of which having said weight decimals inscribed in coded form; a first projection apparatus producing an optically enlarged image from the particular part of said first scale onto a screen visible from the outside of the balance, a second projection apparatus producing an optically enlarged image from the particular part of said second scale at an electric light scanning device for transforming said weight decimals into corresponding electrical values, and a mechanical-optical adjusting device simultaneously controlling both a light deflecting element of said first projection apparatus and also a light deflecting element of said second projection apparatus for resetting the zero point of the balance.

2. A precision balance according to claim 1, further including an optical micrometer having adjusting means to determine the last weight decimals of the weighting result, said adjusting means simultaneously controlling both a further light deflecting element provided in said first projection apparatus and also a further light deflecting element provided in said second projection apparatus, said adjusting means further controlling a reading member from which said last weight decimals may be visually read off and a measuring member having said last weight decimals inscribed in coded form, and a third projection apparatus producing an optically enlarged image from the particular part of said reading member at an further electric light scanning device for transforming said last weight decimals into corresponding electrical values according to the particular setting of said adjusting means.

3. A precision balance according to claim 2, further including in each of said two electric light scanning devices a light sensing element per decade of the weighing result, and an electro-mechanical drive common to said two electric light scanning devices which simultaneously carries out the scanning operation in both of said electric light scanning devices.

4. A precision balance according to claim 3, wherein said light sensing elements are mounted stationary in each of said two electric light scanning devices and wherein said electro-mechanical drive is arranged to pivot both a light deflecting scanning member inserted in said second projection apparatus and a light deflecting scaning member inserted in said third projection apparatus.

References Cited

UNITED STATES PATENTS

| | | | |
|---|---|---|---|
| 2,583,690 | 1/1952 | Feuer | 177 178 XR |
| 3,059,709 | 10/1962 | Karp. | |
| 3,130,802 | 4/1964 | Bell. | |
| 3,181,633 | 5/1965 | Worst. | |
| 3,358,784 | 12/1967 | Weickhardt | 177—173 |
| 3,376,943 | 4/1968 | Karp | 177—173 |

ROBERT S. WARD, JR., Primary Examiner

U.S. Cl. X.R.

177—3, 178